United States Patent [19]
Friederich et al.

[11] Patent Number: 5,722,794
[45] Date of Patent: Mar. 3, 1998

[54] FLOAT FOR FLOATING FLEXIBLE PIPES

[75] Inventors: Hans-Werner Friederich, Winsen; Winfried Hellmig, Buxtehude; Uwe Maass, Hamburg, all of Germany

[73] Assignee: Phoenix Aktiengesellschaft, Hamburg, Germany

[21] Appl. No.: 604,963

[22] PCT Filed: Jun. 29, 1995

[86] PCT No.: PCT/DE95/00831

§ 371 Date: Feb. 27, 1996

§ 102(e) Date: Feb. 27, 1996

[87] PCT Pub. No.: WO96/01385

PCT Pub. Date: Jan. 18, 1996

[30] Foreign Application Priority Data

Jul. 2, 1994 [DE] Germany .......................... 44 23 299.3

[51] Int. Cl.$^6$ ...................................... F16L 1/04
[52] U.S. Cl. .................. 405/171; 405/158; 405/63
[58] Field of Search ..................... 405/171, 158, 405/195.1, 169, 170, 63–72, 60

[56] References Cited

U.S. PATENT DOCUMENTS

| | | | |
|---|---|---|---|
| 3,594,835 | 7/1971 | Wilson | 405/171 X |
| 4,107,933 | 8/1978 | Lamy | 405/171 |
| 4,706,711 | 11/1987 | Czvikovszky et al. | 405/171 X |

FOREIGN PATENT DOCUMENTS

| | | | |
|---|---|---|---|
| 0216418 | 4/1987 | European Pat. Off. | 405/171 |
| 1240554 | 8/1960 | France | 405/171 |
| 2091733 | 1/1972 | France. | |
| 2306394 | 10/1976 | France. | |
| 940787 | 3/1956 | Germany. | |
| 33 33 522 A1 | 4/1985 | Germany. | |

*Primary Examiner*—Dennis L. Taylor
*Attorney, Agent, or Firm*—Collard & Roe, P.C.

[57] ABSTRACT

A float (1) for floating flexible pipes has a multilayered foam body (3) that surrounds the floating flexible pipe (2), a textile cover (4) arranged on the foam body (3) and having in particular several transverse layers, and an outer covering (5) made of an elastomer, a thermoplastic elastomer or a thermoplastic material. The float (1) is further provided with a transverse textile reinforcement (6) that forms with the axis an angle from 75° to 90°, in particular from 85° to 90°.

20 Claims, 5 Drawing Sheets

FLOAT FOR FLOATING FLEXIBLE PIPES

BACKGROUND OF THE INVENTION

1. Field of the Invention

The invention relates to a float for floating hoses, comprising a multilayered foam body surrounding the floating hose, a textile cover, the latter being present on the foam body and having in particular several crossed layers, as well as an outer covering consisting of an elastomer, a thermoplastic elastomer (TPE), or a thermoplastic material.

2. The Prior Art

Floating bodies for floating hoses are currently manufactured as integrated floating bodies in a way such that the foam layers are fused or glued together, forming one unit. A textile cover and an outer covering made of the above-mentioned materials are arranged on said floating body. In this connection, the two coverings are solidly joined with the actual hose body.

In connection with floating hoses structured in said way, the following damage can be observed due to external influences:

(a) The two coverings are torn off in the end zones as a result of very high axial stress.

(b) A radial fracture of the float (floating body) frequently occurs as a result of axial and dynamic stress as well as buckling stress, with simultaneous breakage of the two coverings.

(c) Partial abrasion as well as slitting on sharp objects causes tearing of the two coverings.

SUMMARY OF THE INVENTION

For the purpose of eliminating the aforementioned weak points and particularly for the purpose of increasing the resistance to slitting and the resistance to abrasion, the floating body according to the invention is provided with an additional textile, transverse reinforcement extending at an angle of 75° to 90°, particularly 85° to 90° relative to the axis.

BRIEF DESCRIPTION OF THE DRAWINGS

Now, the invention is explained in the following on exemplified embodiments with reference to the schematic drawings, in which.

DETAILED DESCRIPTION OF THE PREFERRED EMBODIMENT

Figure 1:
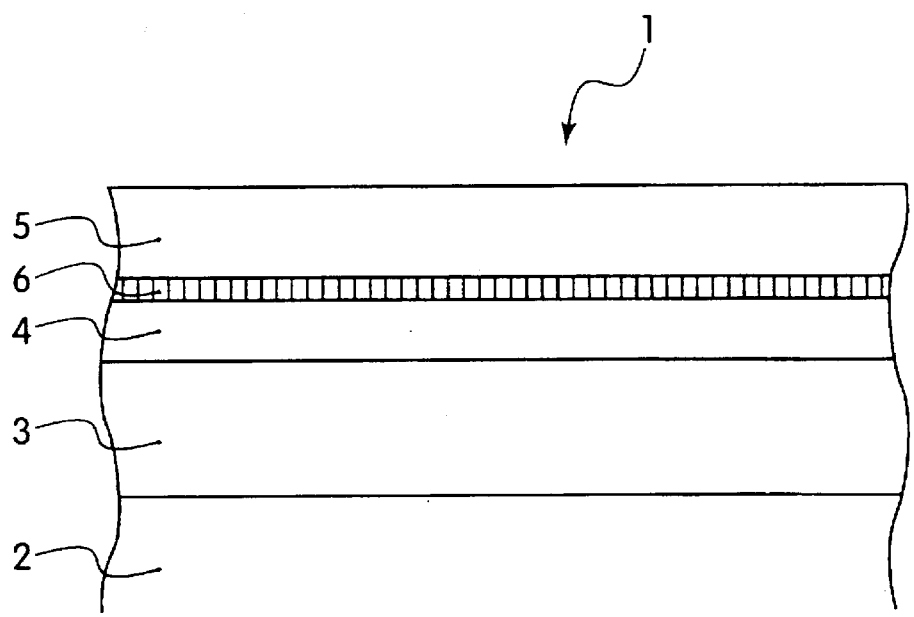
FIG. 1 shows an axial sectional view of a floating body with a useful basic structure.

FIG. 1 shows the following layer structure of the floating body (1):

2 Floating hose
3 Foam body
4 Textile cover
5 Outer covering
6 Transverse textile reinforcement.

The transverse reinforcement (6), which is arranged between the textile cover (4) and the outer covering (5), is designed single-layered, whereby the rings, at an angle of 90°, are disposed closely against each other. The textile cover (4) and the transverse reinforcement (6) are preferably made of polyamide or polyester.

The foam body particularly consists of a polyethylene foam. With respect to the outer covering, the following materials are useful:

Elastomer: Ethylene-propylene-diene copolymer (EPDM)

TPE: Mixture of polyethylene and polypropylene

Thermoplastic: Polyethylene (PE), polypropylene (PP), polyvinyl chloride (PVC).

Figure 2:
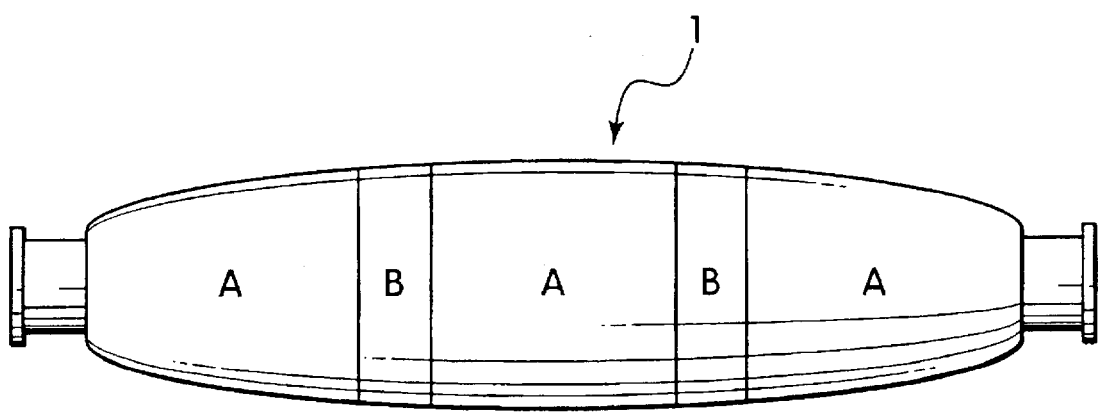
FIG. 2 shows an axial sectional view of a floating body with the segments (A, B)

The segments (A, B) shown in FIG. 2 have to be viewed in connection with the useful embodiments of the foam body (3) and the textile cover (4). In detail:

In the axial direction, the foam body (3) is alternately structured of hard segments A) and soft segments (B), whereby the segments (A) are hard in the zone of the face area.

Figure 7:
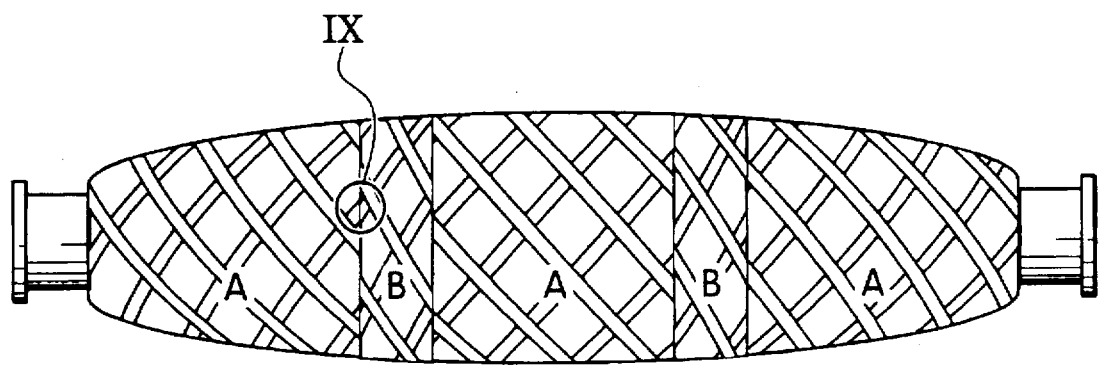
FIG. 7 shows a side view of the textile cover of the embodiment shown in FIG. 2.
Figure 9:
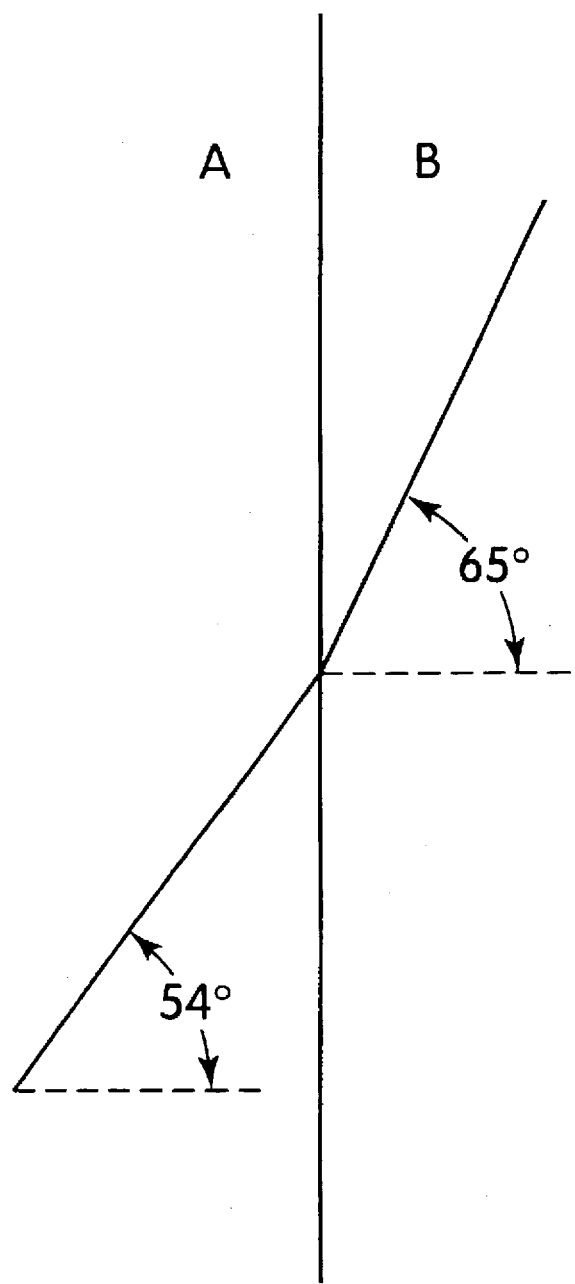
FIG. 9 shows a schematic view of the different angles of the textile cover within section XI shown in FIG. 7.

In the segments (A, B), the textile cover (4) has alternately an angle of 54° (segment A) and 65° (segment B) relative to the axis, whereby the angle in the zone of the face area amounts to 54° as shown in FIGS. 7 and 9.

Owing to such segmenting, the susceptibility of the floating body to wear is reduced to a considerable degree.

Figure 8:
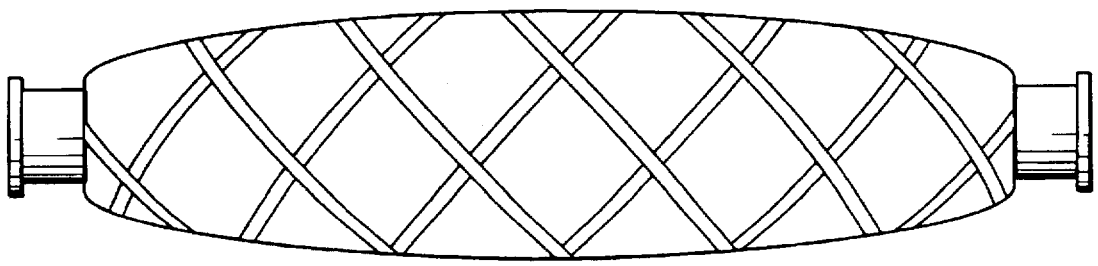
FIG. 8 shows a side view of the textile cover of an alternative embodiment of the invention.

Within the framework of an alternative, the angle of the textile cover (4) may also be constant, whereby the angle relative to the axis usefully comes to 60° as shown in FIG. 8.

Figure 3:
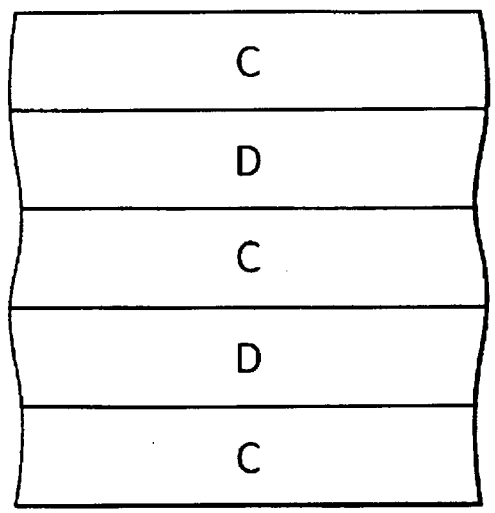
FIG. 3 shows an axial sectional view of the foam body with the sections (C, D)

FIG. 3 shows the foam core (3), which, in the radial direction, is alternately structured of hard foam layers (C) and soft foam layers (D), whereby the outer layers (C) are hard. In their radial structure, the foam layers (C, D) may be partly fused with each other, and partly separated from each other by a sliding foil. If need be, one or several textile layers may be incorporated between the foam layers (C, D) as strength carriers particularly based on polyamide or polyester.

Figure 4:
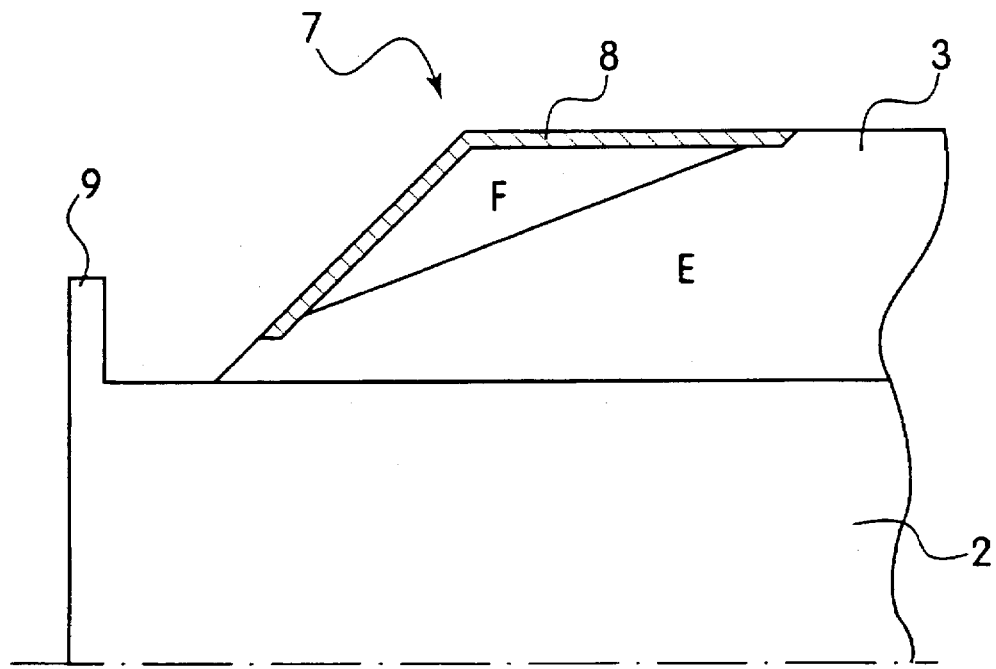
FIG. 4 shows an axial sectional view of the corner zone of the face area and the cylindrical body with the segments (E, F), and a reinforcement arranged on the outside.

According to FIG. 4, the foam body (3) is formed in the corner zone (7) of the face area and the cylindrical body by a soft foam segment (F) and a hard foam segment (E), whereby an outer reinforcement (8) is additionally present, the latter particularly being based on polyamide or polyester. The floating hose itself is provided with a flange (9).

Figure 5:
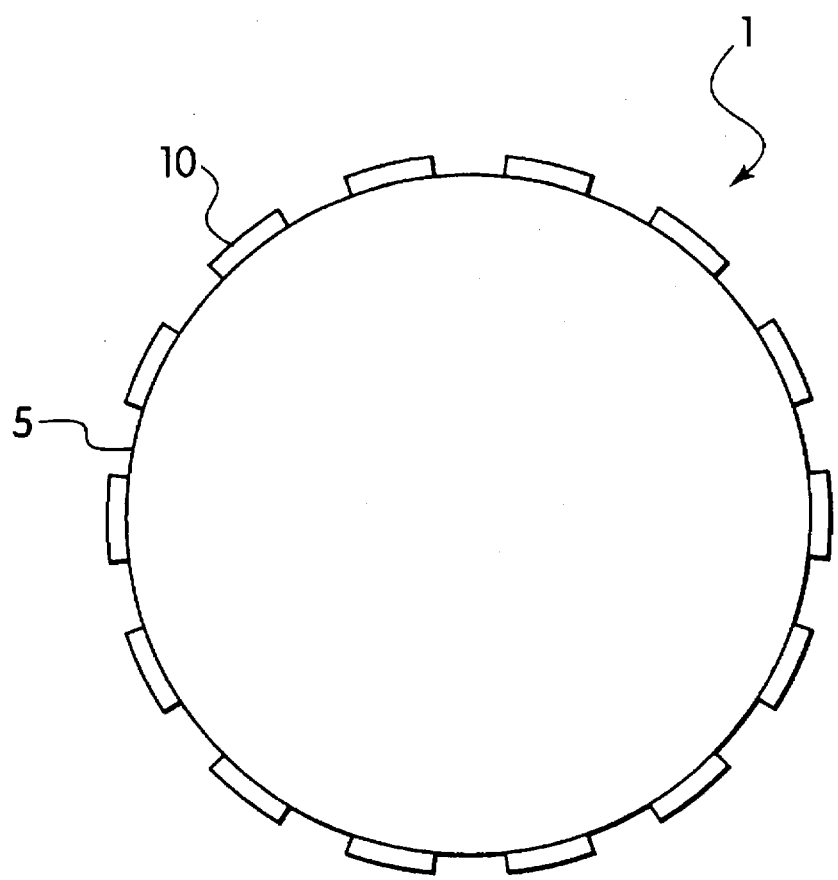
FIG. 5 shows a radial sectional view of the floating body with strips arranged in the radial direction.

FIG. 5 shows the outer covering (5) of the floating body (1), whereby the strips (10) are mounted on the outside in the axial direction with spacing from each other, such strips consisting of a material highly resistant to abrasion.

Figure 6:
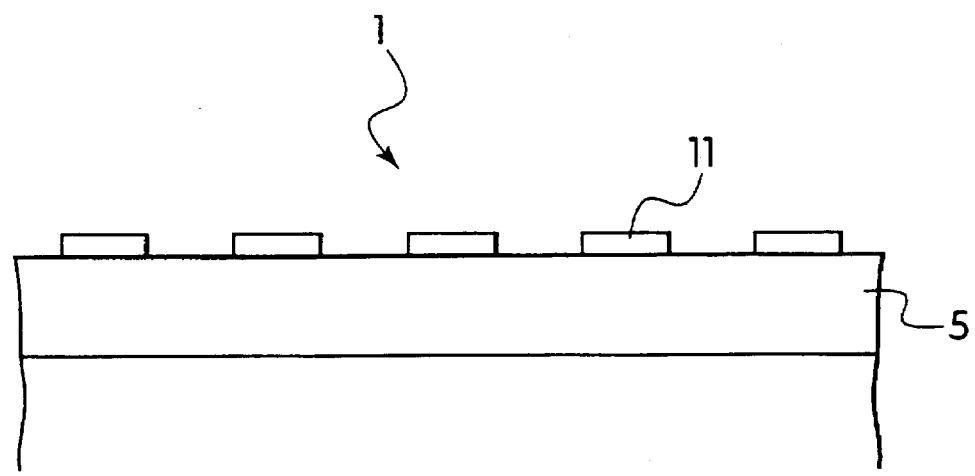
FIG. 6 shows an axial sectional view of the floating body with rings arranged in the radial direction.

FIG. 6, too, shows the outer covering (5), whereby the rings (11) are mounted on the outside in the radial direction especially within the marking zone, such rings consisting of a material highly resistant to abrasion.

We claim:

1. Floating body for floating hoses said body having a face zone and a cylindrical body, comprising a multilayered foam body surrounding the floating hose;

a textile cover arranged on the foam body and being designed multilayered and crossed; as well as an outer covering made from a material selected from the group consisting of an elastomer, a thermoplastic elastomer and a thermoplastic material, wherein the floating body is provided with an additional transverse textile reinforcement extending at an angle of 75° to 90° relative to the axis.

2. Floating body according to claim 1, wherein the transverse reinforcement is comprised of a plurality of single-layered rings, whereby the rings are disposed closely to each other at an angle of 90°.

3. Floating body according to claim 1, wherein the transverse reinforcement is arranged between the textile cover and the outer covering.

4. Floating body according to claim 1, wherein the textile cover and the transverse reinforcement are made from a material selected from the group consisting of polyamide and polyester.

5. Floating body according to claim 1, wherein the foam body consists of polyethylene foam.

6. Floating body according to claim 1 wherein the foam layers are, in their radial structure, partly fused with each other and partly separated from each other by a sliding foil.

7. Floating body according to claim 1 characterized in that the foam body, in the radial direction, is alternately structured from hard foam layers and soft foam layers, said foam body having hard outer layers.

8. Floating body according to claim 7 characterized in at least one textile layer is incorporated as a strength carrier between the foam layers.

9. Floating body according to claim 1 wherein in the axial direction, the foam body is alternately structured from hard segments and soft segments, whereby the segments are hard in the face zone of the floating body.

10. Floating body according to claim 1 wherein in the corner zone of the face area and the cylindrical body of the floating body, the foam body is formed by a soft foam segment arranged on a hard foam segment, and wherein an outer reinforcement is additionally present, such reinforcement being made from polyamide and polyester.

11. Floating body according to claim 1 wherein the layers of the textile cover are arranged at an angle of 54° to 65° relative to the axis.

12. Floating body according to claim 11 wherein the angle is constant and particularly amounts to 60°.

13. Floating body according to claim 11 wherein the course of the angle is segmented, and alternates at an angle of 54° and of 65°, whereby in the face area, the angle comes to 54°.

14. Floating body according to claim 1 wherein the outer covering consists of a weather- and aging-resistant elastomer.

15. Floating body according to claim 1 wherein the outer covering consists of a thermoplastic elastomer based on a polyethylene/polypropylene mixture.

16. Floating body according to claim 1 wherein the outer covering consists of a thermoplastic material selected from the group consisting of polyethylene, polypropylene and polyvinyl chloride.

17. Floating body according to claim 1 wherein strips consisting of a highly abrasion-resistant material are mounted on the outer covering in the axial direction, said strips being spaced from each other.

18. Floating body according to claim 1 wherein highly abrasion-resistant rings are mounted on the outer covering in the radial direction.

19. Floating body according to claim 14, wherein the outer covering is an ethylene-propylene-diene copolymer.

20. Floating body according to claim 1, wherein the angle is between 85° and 90° relative to the axis.

* * * * *